United States Patent
Faruque et al.

(10) Patent No.: US 9,180,830 B1
(45) Date of Patent: Nov. 10, 2015

(54) INFLATABLE DEVICE FOR ARMREST OF VEHICLE DOOR

(71) Applicant: Ford Global Technologies, LLC, Dearborn, MI (US)

(72) Inventors: Mohammed Omar Faruque, Ann Arbor, MI (US); Jamel E. Belwafa, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/573,173

(22) Filed: Dec. 17, 2014

(51) Int. Cl.
*B60R 21/21* (2011.01)
*B60R 21/04* (2006.01)
*B60N 2/46* (2006.01)
*B60R 21/231* (2011.01)
*B60R 21/235* (2006.01)

(52) U.S. Cl.
CPC ............ *B60R 21/0428* (2013.01); *B60N 2/466* (2013.01); *B60R 21/21* (2013.01); *B60R 21/23138* (2013.01); *B60R 2021/0407* (2013.01); *B60R 2021/23519* (2013.01)

(58) Field of Classification Search
CPC combination set(s) only.
See application file for complete search history.

(56) References Cited

U.S. PATENT DOCUMENTS

| | | | |
|---|---|---|---|
| 5,439,248 A * | 8/1995 | Steffens et al. ............ | 280/730.2 |
| 5,445,430 A * | 8/1995 | Nichols .................... | 296/153 |
| 5,447,326 A * | 9/1995 | Laske et al. ............... | 280/728.3 |
| 5,531,470 A | 7/1996 | Townsend | |
| 5,549,327 A * | 8/1996 | Rusche et al. ............. | 280/751 |
| 5,647,609 A | 7/1997 | Spencer et al. | |
| 5,967,594 A * | 10/1999 | Ramanujam ................ | 296/153 |
| 6,206,411 B1 | 3/2001 | Sunabashiri | |
| 6,712,385 B2 * | 3/2004 | Enders ...................... | 280/730.1 |
| 6,874,811 B2 * | 4/2005 | Enders et al. .............. | 280/730.1 |
| 7,322,598 B2 * | 1/2008 | Galmiche et al. .......... | 280/730.1 |
| 7,350,852 B2 * | 4/2008 | Rust et al. ................. | 296/187.06 |
| 7,413,215 B2 * | 8/2008 | Weston et al. ............. | 280/730.2 |
| 7,775,584 B2 * | 8/2010 | Hughes et al. ............. | 296/187.05 |
| 7,828,388 B2 * | 11/2010 | Thomas .................... | 297/411.21 |
| 7,980,589 B2 * | 7/2011 | Best et al. .................. | 280/730.1 |
| 7,992,895 B2 * | 8/2011 | Roychoudhury et al. .... | 280/732 |
| 8,231,138 B2 * | 7/2012 | Sadr et al. .................. | 280/730.2 |
| 2009/0152849 A1 * | 6/2009 | Saraf et al. ................. | 280/730.2 |

OTHER PUBLICATIONS

Side Airbags, Autoliv.com, http://www.autoliv.com/ProductsAndInnovations/PassiveSafetySystems/Pages/Airbags/SideAirbags.aspx (2 pages).

* cited by examiner

*Primary Examiner* — Nicole Verley
(74) *Attorney, Agent, or Firm* — Frank A. MacKenzie; Charles A. Bieneman

(57) ABSTRACT

A door assembly for a vehicle includes a trim panel and an armrest core supported on the trim panel. An inflatable device is disposed on the armrest core for cushioning impact between an occupant of the vehicle and the armrest core during an impact of the vehicle. The inflatable device includes an inflation chamber defined by a backing, a cover, a pleated side extending from the backing to the cover, and a fabric side extending from the backing to the cover along the pleated side.

20 Claims, 8 Drawing Sheets

INFLATABLE DEVICE FOR ARMREST OF VEHICLE DOOR

BACKGROUND

A vehicle, such as an automobile, includes two or four doors allowing for ingress and egress. Each door includes a door panel facing externally and a trim panel connected to the door panel and facing inwardly toward a passenger compartment of the vehicle. The door panel is typically formed of metal and the trim panel is typically formed of polymeric material such as plastic, vinyl, etc.

The trim panel provides an aesthetic appearance in the passenger compartment of the vehicle. The trim panel may include a shell and a console supported on the shell. The console may support several features such as a finger well for opening and closing a door, switches for automatic windows and door locks, etc.

An armrest is mounted to trim panel and/or the console for supporting the arm of an occupant of the vehicle while the occupant rides in the vehicle and for supporting the occupant during ingress and egress. The armrest and the console are subject to durability requirements. Specifically, the console, along with the connection between the console and the shell of the trim panel, is designed to withstand repeated pushing and pulling associated with opening and closing the door. The armrest, along with the connection between the armrest and the shell of the trim panel, is designed to withstand forces exerted on the armrest by the occupant during ingress and egress, and to withstand forces exerted on the armrest by the occupant while travelling in the vehicle. Accordingly, the console and the armrest are formed to be rigid and the shell, console, and armrest are designed to be rigidly connected to each other.

During an impact of the vehicle, such as a side impact, oblique impact, rollover, etc., the door panel may bow inwardly, forcing the trim panel inwardly toward the occupant. The door is coincidentally designed such that the armrest is aligned laterally with the ribs of the occupant. As such, as the door panel bows inwardly during an impact, the door panel may force the armrest into the ribs of the occupant.

Competing design factors exist due to the desire to design the armrest to be rigid to support the occupant, e.g., during ingress and egress and during travel, versus the desire to avoid or reduce injury to the ribs of the occupant during an impact. There remains an opportunity to design an armrest assembly that avoids these competing design factors.

DETAILED DESCRIPTION

Figure 1:
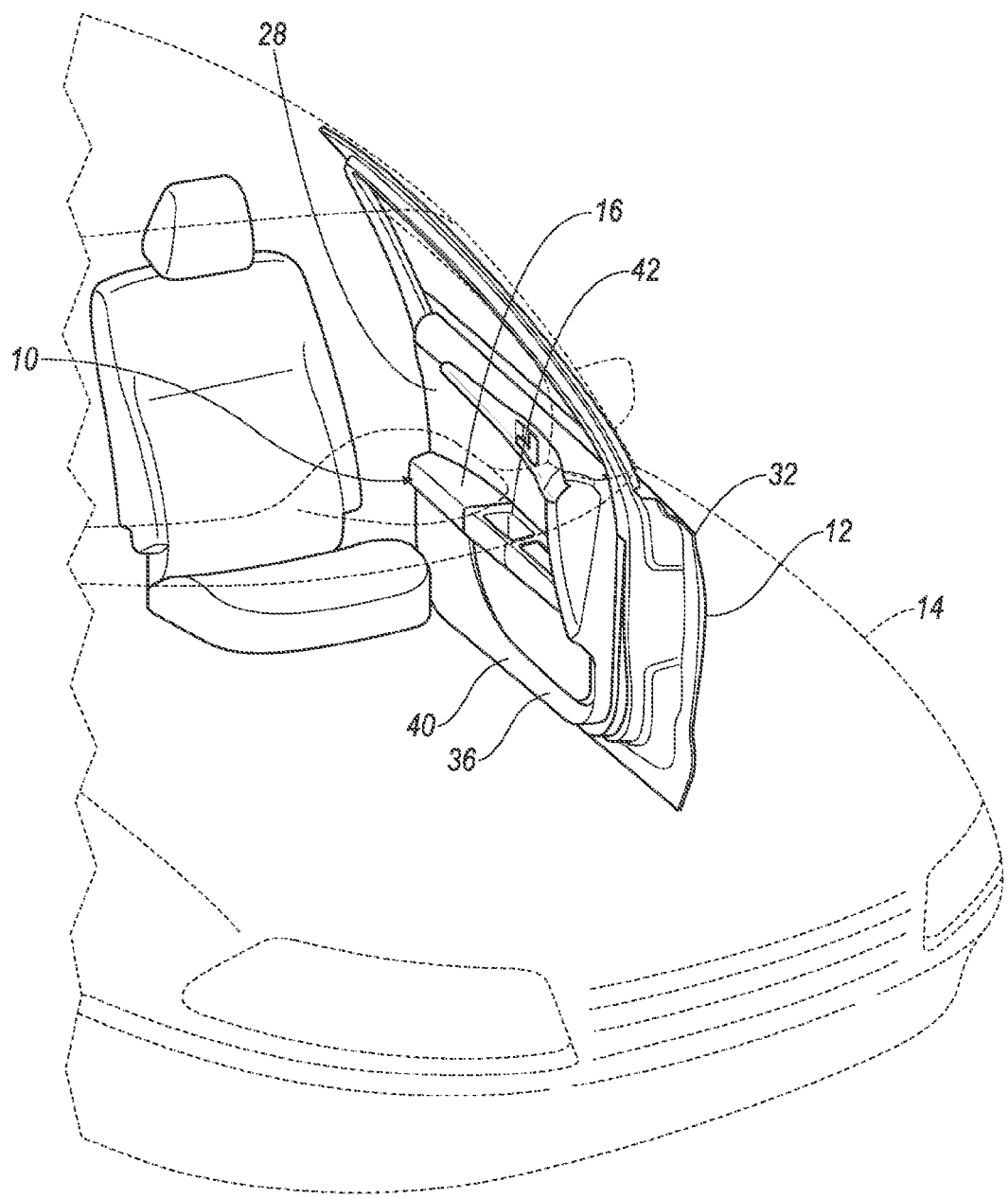
FIG. 1 is a perspective view of a vehicle shown in broken lines including a door assembly and a seat adjacent the door assembly.

With reference to the Figures, wherein like numerals indicate like parts throughout the several views, an inflatable device 10 for a door assembly 12 of a vehicle 14 is generally shown. The inflatable device 10 includes a cover 16 and a backing 18. A pleated side 20 extends from the backing 18 to the cover 16 and defines a pleat 22 between the backing 18 and the cover 16. A fabric side 24 extends from the backing 18 to the cover 16 along the pleated side 20 to define an inflation chamber 26 between the cover 16, the backing 18, the pleated side 20, and the fabric side 24. In other words, the inflation chamber 26 is defined by the backing 18, the cover 16, the pleated side 20, and the fabric side 24.

The door assembly 12 includes a trim panel 28 and an armrest core 30 supported on the trim panel 28. The backing 18 of the inflatable device 10 is attached to the armrest core 30. This configuration beneficially fits within packaging constraints of the door assembly 12.

Figure 2:
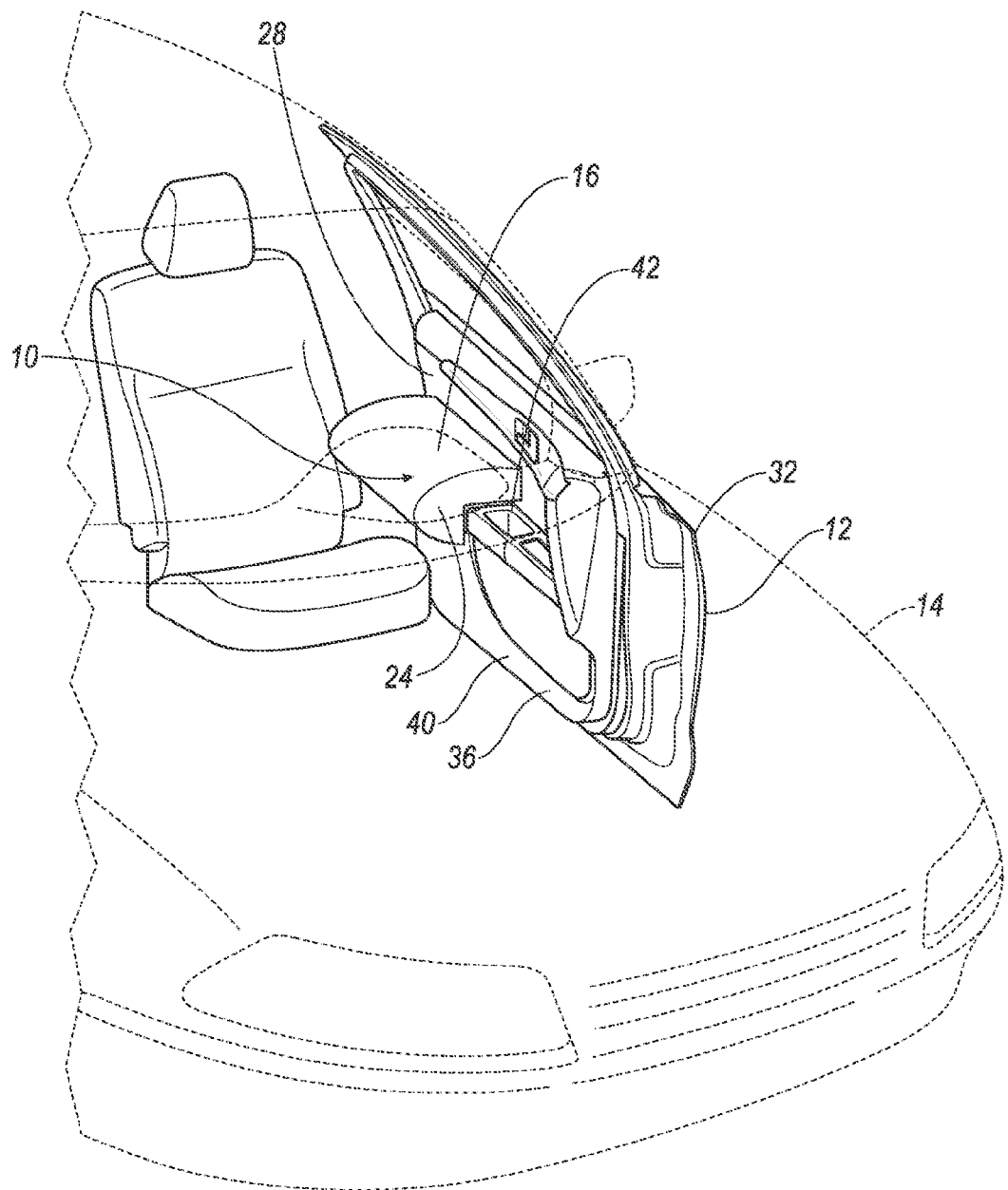
FIG. 2 is the perspective view FIG. 1 with an inflatable device of the door assembly in an inflated position.
Figure 3:
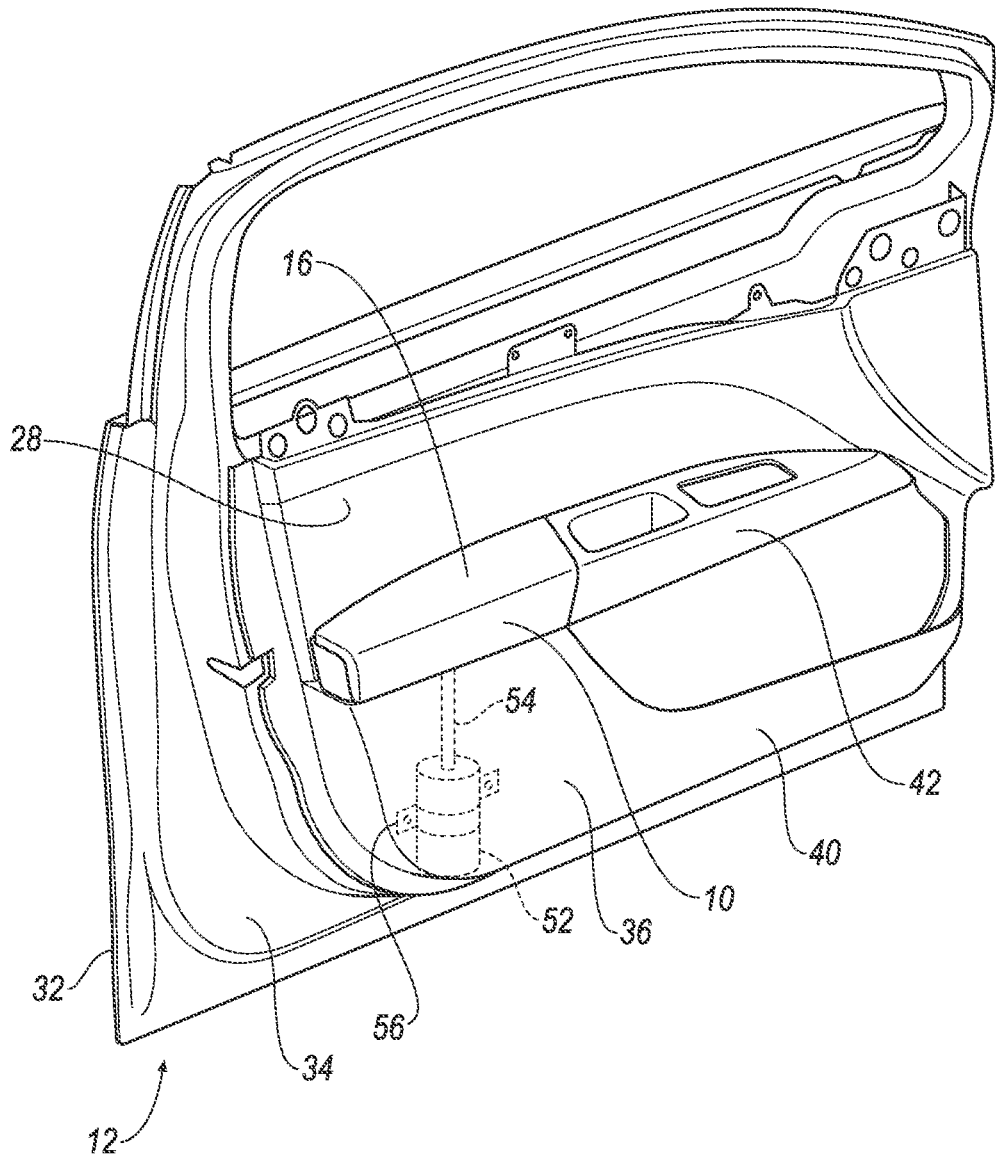
FIG. 3 is a perspective view of the door assembly including an inflatable device and an inflator, which is shown in hidden lines.
Figure 4:
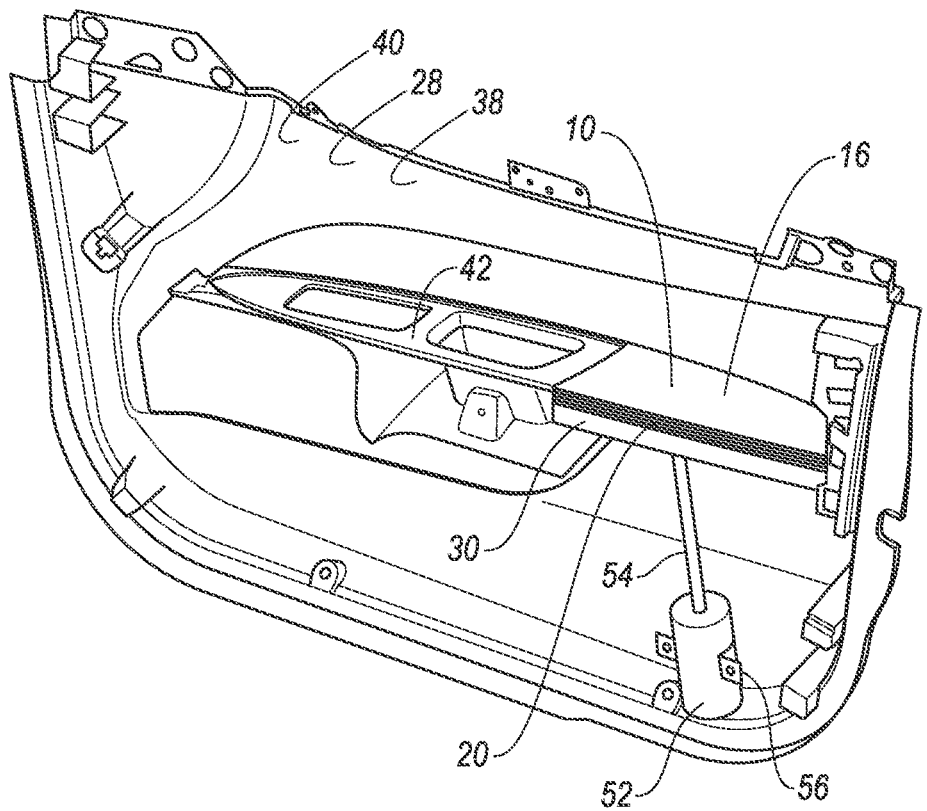
FIG. 4 is a perspective view of a trim panel of the door assembly and the inflatable device disposed on an armrest core.
Figure 5:
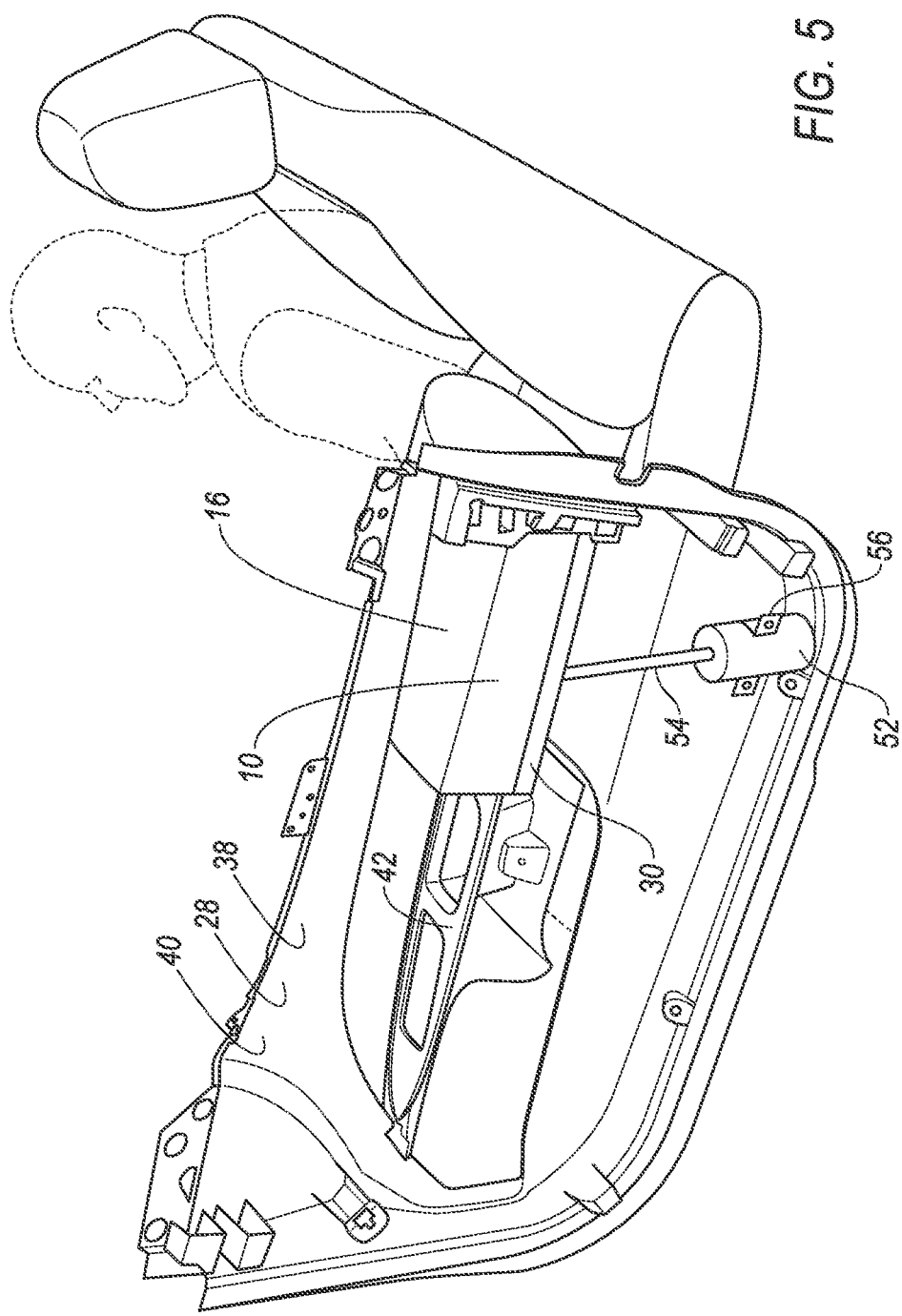
FIG. 5 is the perspective view of the trim panel of FIG. 4 adjacent an occupant and in the inflated position.

As set forth further below, during typical operating conditions of the vehicle 14, the inflatable device 10 is in an uninflated position, as shown in FIGS. 1, 3, and 4. During an impact of the vehicle 14, the inflatable device 10 may be inflated to an inflated position, as shown in FIGS. 2 and 5, to assist in cushioning the impact between the armrest core 30 and an occupant of the vehicle 14 seated adjacent the door assembly 12. In particular, for example, the armrest core 30 may be positioned adjacent the ribs of an occupant, and the inflatable device 10 may be inflated when a side-impact of the vehicle 14 is sensed, e.g., with the impact sensing system 58 as set forth further below, to cushion impact between the armrest core 30 and the ribs of the occupant. The inflatable device 10 may slow the torso of the occupant and absorb energy from the occupant when moved to the inflated position.

With reference to FIG. 5, an armrest assembly of the door assembly 12 includes the armrest core 30 and the inflatable device 10 connected to the armrest core 30. The armrest core 30 is positioned to support an arm of an occupant (shown in FIG. 5) when the occupant is seated in the vehicle 14. The armrest core 30 is also positioned to support an occupant during ingress and egress, e.g., to support the weight of the occupant when the occupant leans on the armrest core 30. At least a portion of the inflatable device 10 is disposed between the armrest core 30 and the occupant.

With reference to FIGS. 1, 2, and 5, the armrest core 30 may be aligned with ribs of the occupant. During an impact of the vehicle, 14, e.g., a vehicle-to-vehicle collision resulting in a side impact, an oblique impact, a rollover, etc., the armrest core 30 may be pushed inwardly toward the occupant. Before and/or during such movement of the armrest core 30 toward the occupant, the inflatable device 10 may be inflated to cushion potential impact between the armrest core 30 and the occupant.

With reference to FIGS. 1-3, the door assembly 12 includes a door panel 32 pivotally mounted to a body of the vehicle 14. The door panel 32 presents an exterior surface (not shown) and an interior surface 34. The door panel 32 may be formed of metal, such as steel, and may support hardware such as a window, exterior handles, etc. Although the door assembly 12 is shown as a driver side front door assembly in the Figures, the door assembly 12 may be any door assembly of the vehicle 14.

The trim panel 28 includes an interior surface 36, as shown in FIGS. 1-3, facing the interior of the vehicle 14, i.e., facing the occupant, and an exterior surface 38, as shown in FIGS. 4-5, facing the door panel 32. The interior surface 36 provides an aesthetic appearance.

With reference to FIGS. 1-3, the trim panel 28 is supported on the door panel 32. Specifically, the trim panel 28 includes a shell 40 mounted to the interior surface 34 of the door panel 32 in any suitable manner, e.g., with clips, pins, etc. The shell 40 may support features such as an interior door handle, a map holder, etc. The shell 40 may be formed of polymeric materials such as plastic and/or vinyl, etc.

With continued reference to FIG. 3, the trim panel 28 may include a console 42 supported on the shell 40. The console 42 may support a finger well for opening and closing the door assembly 12, switches for automatic windows and door locks, etc. The console 42 may be formed of polymeric materials such as plastic and/or vinyl, etc.

The console 42 may be mounted to the shell 40 in any suitable manner such as with clips, pins, adhesives, etc., and combinations thereof. The console 42 may be designed to withstand repeated pushing and pulling associated with opening and closing the door assembly 12. The console 42 may also be designed to withstand forces exerted on the console 42 by the occupant during ingress and egress, and to withstand forces exerted on the console 42 by the occupant while travelling in the vehicle 14.

With reference to FIGS. 4 and 5, the armrest core 30 is supported on the shell 40 and extends from the shell 40 toward the interior surface 34 of the door panel 32. The armrest core 30 may be rigid relative to the shell 40. The armrest core 30 may be formed of polymeric material, such as plastic, for example.

The inflatable device 10 is supported on the armrest core 30. At least a portion of the inflatable device 10 is disposed between the armrest core 30 and the occupant. The inflatable device 10 may be shaped to match the shape of adjacent portions of the trim panel 28. For example, with reference to FIGS. 6 and 7, the inflatable device 10 may include a first portion 44 and a second portion 46 extending transverse to each other to define an L-shape. Alternatively, the inflatable device 10 may be of any suitable size and shape.

As set forth above, the inflatable device 10 is attached to the armrest core 30. For example, the backing 18 of the inflatable device 10 may be attached to the armrest core 30 with adhesive. For example, the backing 18 may define a continuous surface 48, shown in FIG. 7, abutting the armrest core 30. In addition, or in the alternative, the backing 18 may include flanges (not shown) connected to the armrest core 30 with threaded fasteners, Christmas tree fasteners, etc. Alternatively, the inflatable device 10 may be attached to the armrest core 30 in any suitable fashion.

The shape of the backing 18 may match the shape of the armrest core 30. The backing 18 may be flexible relative to the armrest core 30 and, for example, may be fabric. For example, the backing 18 may be formed of woven nylon or any other material used in industry for construction of automotive air bags. Alternatively, the backing 18 may be rubber, plastic, metal, or any other suitable material. The backing 18 may be formed of the same type of material as the fabric sides 24 or may be formed of the same type of material as the cover 16 and/or pleated sides 20.

Figure 8:
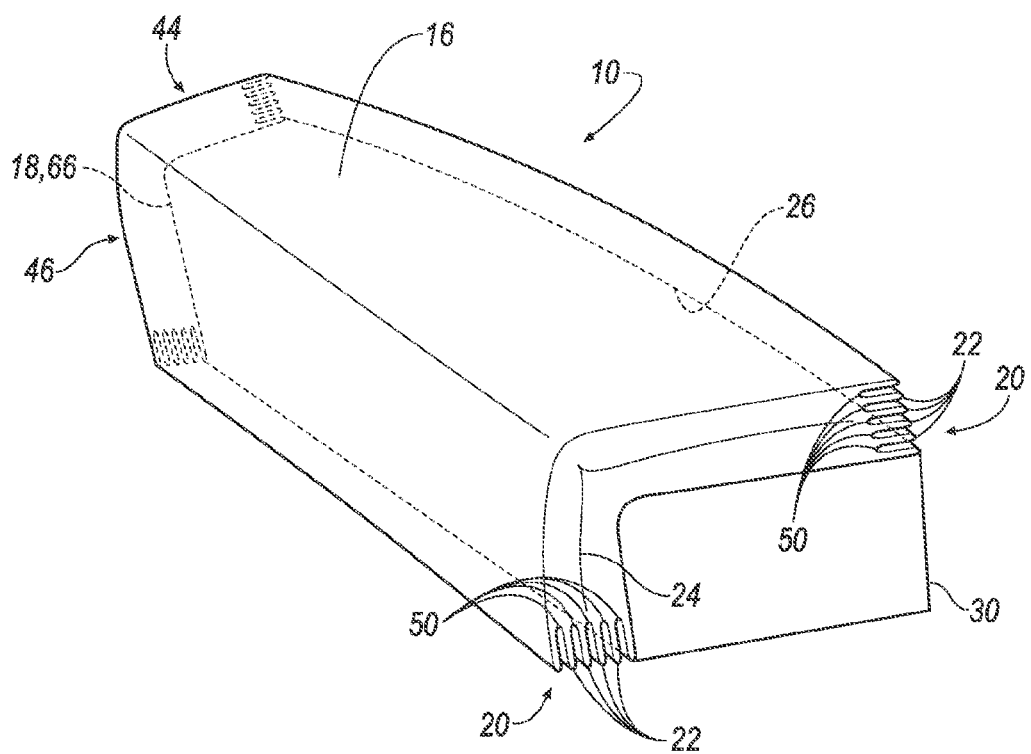
FIG. 8 is a perspective view of another embodiment of the inflatable device.

In an alternative embodiment, as shown in FIG. 8, the backing may be defined as a surface 66 of the armrest core 30. In other words, in the embodiment of FIG. 8, the inflation chamber 26 is defined by the armrest core 30, the pleated sides 20, the fabric sides 24, and the cover 16. In such an embodiment, the pleated sides 20 and the fabric sides 24 may be connected to the surface 66 of the armrest core 30 by adhesive, welding, overmolding, or any other suitable manner.

The cover 16 faces an interior of the vehicle 14. The cover 16 may present an aesthetic appearance, i.e., may be a class-A surface. The cover 16 may cover the rest of the inflatable device 10 and the armrest core 30, e.g., to aesthetically conceal the armrest core 30. The cover 16 may be of any suitable size and shape. The cover 16 may, for example, match contours of surfaces of the trim panel 28. The cover 16 may be formed of any suitable material such as, for example, plastic, vinyl, etc. The cover 16 may be flexible relative to the armrest core 30 for deforming when contacted by the occupant during movement from the uninflated position to the inflated position.

The inflatable device 10 may include any suitable number of pleated sides 20 and fabric sides 24. For example, as shown in the Figures, the inflatable device 10 may include a pair of pleated sides 20 and a pair of fabric sides 24. Each pleated side 20 extends from the backing 18 to the cover 16. Each fabric side 24 extends from the backing 18 to the cover 16 along at least one of the pleated sides 20. For example, each fabric side 24 extends from the backing 18 to the cover 16 along both pleated sides 20. While the inflatable device 10 shown in FIGS. 6-7 includes the pair of pleated sides 20 extending in parallel and the pair of fabric sides 24, the inflatable device 10 may include any suitable number of pleated sides 20 and fabric sides 24 in any suitable configuration to allow the inflatable device 10 to expand upon inflation, as set forth further below.

Figure 6:
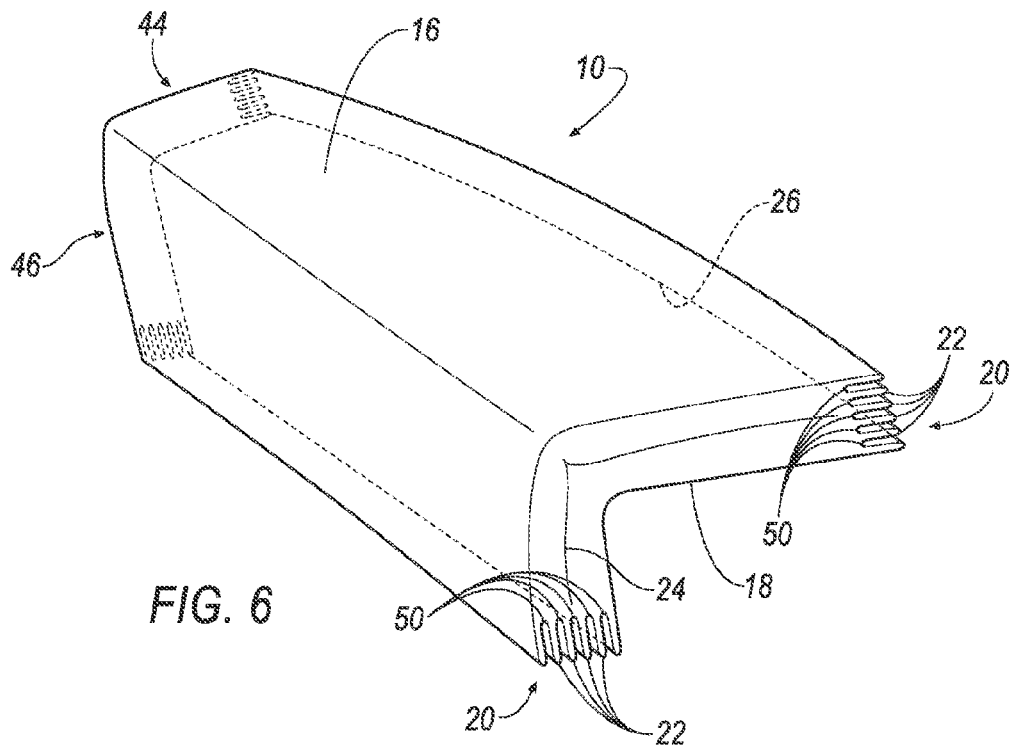
FIG. 6 is a perspective view of the inflatable device.
Figure 7:
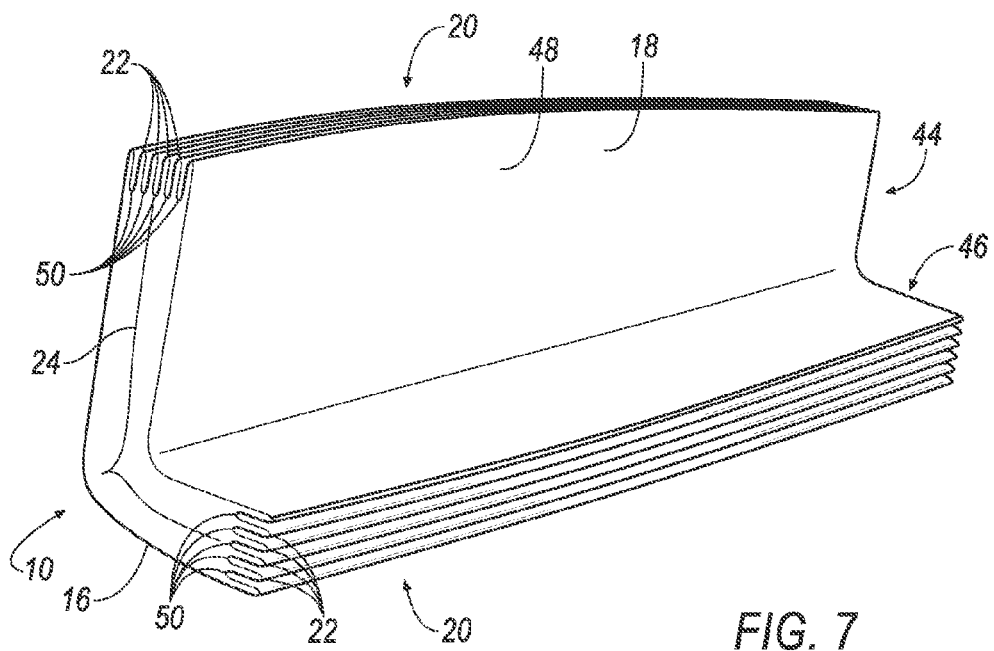
FIG. 7 is another perspective view of the inflatable device.

In configurations including multiple pleated sides 20, the pleated sides 20 may extend in parallel, as shown in FIGS. 6-7. Alternatively, the pleated sides 20 may extend in non-parallel directions to each other and may intersect each other. The pleated sides 20 may be formed of any suitable polymeric material such as, for example, plastic, vinyl, etc. Alternatively, the pleated sides 20 may be formed of fabric. For example, the pleated sides 20 may be formed of woven nylon or any other material used in industry for construction of automotive air bags.

As set forth above, each pleated side 20 defines at least one pleat 22. Each pleat 22 is configured to be compressed while the inflatable device 10 is in the uninflated position and is configured to unfold to allow the cover 16 to expand away from the backing 18 upon inflation to the inflated position. Each pleat 22 may define a crease 50. Each crease 50 may be angular or may be rounded.

As shown in the Figures, each pleated side 20 may define multiple pleats 22 each extending in parallel with each other. The pleated sides 20 may include any suitable number of pleats 22 to allow the inflatable device 10 to expand upon inflation, as set forth further below.

The cover 16 and the pleated sides 20 may be integrally formed with each other, i.e., formed simultaneously as a single continuous unit. Alternatively, the cover 16 and the pleated sides 20 may be formed separately and subsequently assembled together by adhesive, fusing, welding, etc. Whether integrally formed or separately formed, the cover 16 and the pleated sides 20 may be formed of the same type of material or of a different type of material. The cover 16 and pleated sides 20 may be sealed to each other to prevent airflow therebetween. Alternatively, vents (not shown) may be defined between the cover 16 and the pleated sides 20 to allow for venting during expansion of the inflatable device 10. In addition to, or in the alternative to vents between the cover 16 and the pleated sides 20, any of the cover 16 and pleated sides 20 may define vents (not shown).

The fabric sides 24 are connected to the pleated sides 20, the cover 16, and the backing 18. The fabric sides 24 may be folded between the cover 16 and the backing 18 when the inflatable device 10 is in the uninflated position and may unfold as the cover 16 moves away from the backing 18 toward the inflated position.

The fabric sides 24 may be sealed to the pleated sides 20, the cover 16, and the backing 18 to prevent airflow therebetween. Alternatively, vents (not shown) may be defined between the fabric sides 24 and the pleated sides 20, the cover 16, and the backing 18 to allow for venting during expansion of the inflatable device 10. In addition to, or in the alternative to vents between the fabric sides 24 and the pleated sides 20, the cover 16, and/or the backing 18, the fabric sides 24 may define vents (not shown).

The fabric sides 24 may be formed of woven nylon or any other material used in industry for construction of automotive air bags. In the configuration where the backing 18 is fabric, the fabric sides 24 and the backing 18 may be formed of the same type of material, and the fabric sides 24 and the backing 18 may be a single continuous piece of fabric woven together. Alternatively, the fabric sides 24 and the backing 18 may be separate pieces of fabric stitched together.

The flexibility of the fabric sides 24 advantageously allows the cover 16 and the pleated sides 20 to be compressed into the uninflated position. As set forth above, the fabric sides 24 may be folded between the cover 16 and the pleated sides 20 in the uninflated position. The fabric sides 24 do not impede with movement of the cover 16 and pleated sides 20 to the inflated position, and the fabric sides 24, in part, define the position of the cover 16 and pleated sides 20 in the inflated position. In other words, tension in the fabric sides 24 may prevent movement of the cover 16 and the pleated sides 20 beyond the inflated position.

The cover 16 and the pleated sides 20 may be formed onto, and connected to, the fabric sides 24 during formation of the cover 16 and pleated sides 20. For example, the cover 16 and the pleated sides 20 may be overmolded onto the fabric sides 24. Specifically, the fabric sides 24 may be placed into a blow mold (not shown) and the cover 16 and pleated sides 20 may be formed by blow molding material into the mold and into contact with the fabric sides 24 to form the cover 16 and the pleated sides 20 connected to the fabric sides 24.

In the configuration where the backing 18 is formed of fabric, the backing 18 and the fabric sides 24 may both be placed in the blow mold and the cover 16 and pleated sides 20 may be blow molded onto the backing 18 and the fabric sides 24. Alternatively, in the configuration where the backing 18 is formed of the same material as cover 16 and the pleated sides 20, the backing 18, cover 16, and pleated sides 20 may each be blow molded onto the fabric sides 24 in the blow mold.

As set forth above, the backing 18, the pleated sides 20, the cover 16, and the fabric sides 24 define the inflation chamber 26. The inflation chamber 26 may be sealed, i.e., air-tight, or may be vented through the pleated sides 20, the cover 16, and/or the fabric sides 24, as set forth above.

An inflator 52 is in communication with the inflation chamber 26 to expand the inflation chamber 26 with an inflation medium, such as a gas. The inflator 52 may be, for example, a pyrotechnic inflator 52 that uses a chemical reaction to drive inflation medium to the inflation chamber 26. The inflator 52 may be of any suitable type, for example, of the type typically used for inflating automotive air bags, e.g., a cold-gas inflator. A tube 54 may extend from the inflator 52 to the inflatable device 10 and defines a fluid path therebetween.

With reference to FIGS. 4-5, a bracket 56 may connect the inflator 52 to the door panel 32. The bracket 56 may be of any suitable size and shape to connect the inflator 52 to the door panel 32 and may engage the inflator 52 and the door panel 32 in any suitable fashion. It should be appreciated that the inflator 52 may be attached to the door panel 32 in any suitable fashion and in any suitable location.

Figure 9:
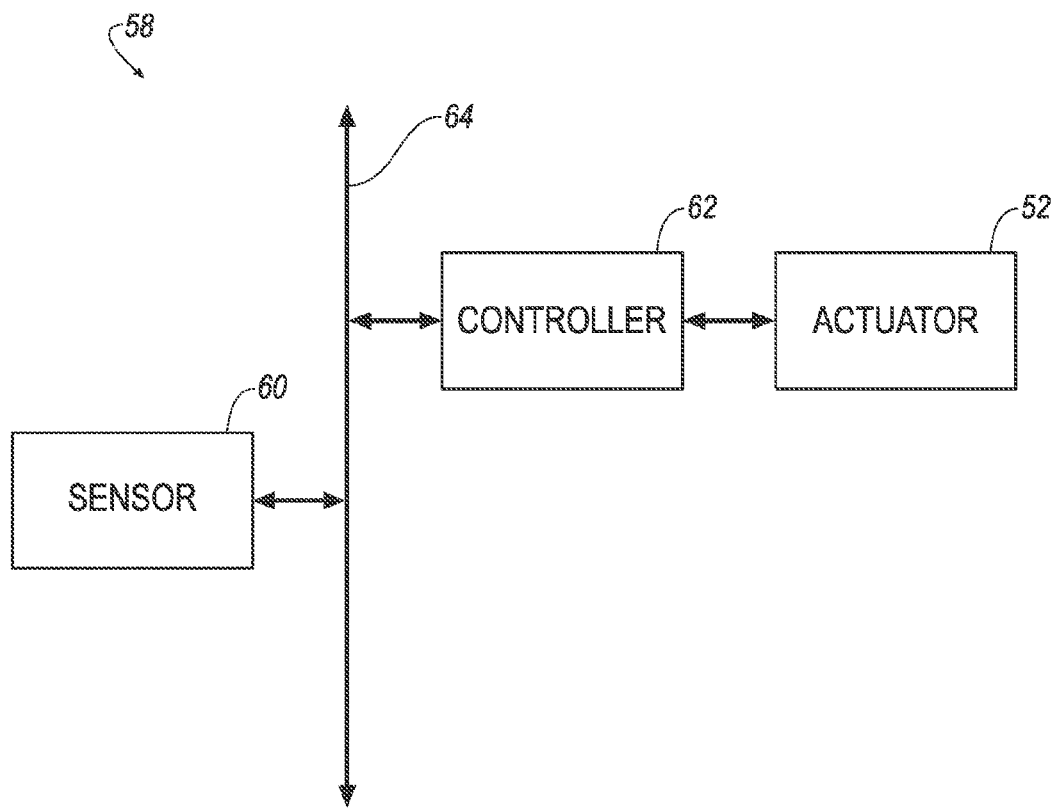
FIG. 9 is a schematic of an impact sensing system of the vehicle.

With reference to FIG. 9, the impact sensing system 58 may include at least one sensor 60 for sensing impact of the vehicle 14, and a controller 62 in communication with the sensor 60 and the inflator 52 for activating the inflator 52, e.g., for providing an impulse to a pyrotechnic charge of the inflator 52, when the sensor 60 senses an impact of the vehicle 14. Alternatively or additionally to sensing impact, the impact sensing system 58 may be configured to sense impact prior to impact, i.e., pre-crash sensing. The sensor 60 may be of any suitable type, e.g., using radar, lidar, and/or a vision system. The vision system may include one or more cameras, CCD image sensors, and/or CMOS image sensor, etc.

The controller 62 may be a microprocessor-based controller 62. The sensor 60 is in communication with the controller 62 to communicate data to the controller 62. Based on the data communicated by the sensor 60, the controller 62 instructs the inflator 52 to activate.

The controller 62 and the sensor 60 may be connected to a communication bus 64, such as a controller 62 area network (CAN) bus, of the vehicle 14. The controller 62 may use information from the communication bus 64 to control the activation of the inflator 52. The inflator 52 may be connected to the controller 62, as shown in FIG. 9, or may be connected to the communication bus 64.

In operation, the inflatable device 10 is in an uninflated position, as shown in FIGS. 1, 3, and 4, under normal operating conditions of the vehicle 14. When the sensor 60 senses an impact of the vehicle 14, e.g., an impact, the impact sensing system 58 triggers the inflator 52 to inflate the inflatable device 10 with the inflation medium from the uninflated position to an inflated position, as shown in FIGS. 2 and 5. As the inflatable device 10 is inflated, the cover 16 moves away from the armrest core 30 toward the occupant to cushion impact between the occupant and the armrest core 30. As the inflatable device 10 is inflated, the pleats 22 of the pleated sides 20 unfold and the fabric sides 24 unfold to allow movement of the cover 16 away from the armrest core 30. The cover 16 and/or the pleated sides 20 may be configured to maintain their thickness, i.e., are not stretched thinner, as the inflatable device 10 is inflated. Alternatively, the cover 16 and/or the pleated sides 20 may be configured to stretch, i.e., thin out, as the inflatable device 10 is inflated. As the occupant contacts the cover 16, the inflatable device 10, e.g., the cover 16, the pleated sides 20, and/or the fabric sides 24, may compress to absorb energy from the occupant. The size of the inflatable device 10 in the inflated position may be designed based on the size and number of pleats 22 and on the dimensions of the fabric sides 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door assembly for a vehicle, the door assembly comprising:
   a trim panel;
   an armrest core supported on the trim panel; and
   an inflatable device including an inflation chamber defined by a backing attached to the armrest core, a cover, a pleated side extending between the armrest core and the cover and defining a pleat between the armrest core and the cover, and a fabric side extending between the armrest core and the cover along the pleated side;

wherein the cover and the pleated side are plastic.

2. The door assembly as set forth in claim 1 further comprising a second fabric side spaced from the fabric side and extending between the armrest core and the cover.

3. The door assembly as set forth in claim 1 further comprising a second pleated side spaced from the pleated side and extending between the armrest core and the cover along the fabric side and the second fabric side.

4. The door assembly as set forth in claim 1 wherein the fabric side is connected to the pleated side.

5. The door assembly as set forth in claim 1 wherein the cover and the pleated side are integrally formed with each other.

6. The door assembly as set forth in claim 1 further comprising a backing attached to the armrest core with the pleated side extending from the backing to the cover and with the fabric side extending from the backing to the cover to define the inflation chamber between the backing, the pleated side, the fabric side, and the cover.

7. The door assembly as set forth in claim 6 wherein the backing is fabric.

8. The door assembly as set forth in claim 1 wherein the pleated side and the fabric side are connected to the armrest core to define the inflation chamber between the armrest core, the pleated side, the fabric side, and the cover.

9. The door assembly as set forth in claim 1 further comprising an inflator in communication with the inflation chamber.

10. An inflatable device for a door assembly of a vehicle, the inflatable device comprising:
a cover;
a backing;
a pleated side extending from the backing to the cover and defining a pleat between the backing and the cover; and
a fabric side extending from the backing to the cover along the pleated side to define an inflation chamber between the cover, the backing, the pleated side, and the fabric side;

wherein the cover and the pleated side are plastic.

11. The inflatable device as set forth in claim 10 further comprising a second fabric side spaced from the fabric side and extending from the backing to the cover.

12. The door assembly as set forth in claim 11 further comprising a second pleated side spaced from the pleated side and extending from the backing to the cover, along the fabric side and the second fabric side.

13. The inflatable device as set forth in claim 10 wherein the fabric side is connected to the pleated side.

14. The inflatable device as set forth in claim 10 wherein the cover and the pleated side are integrally formed with each other.

15. The inflatable device as set forth in claim 10 wherein the backing is fabric.

16. The inflatable device as set forth in claim 10 further comprising an inflator in communication with the inflation chamber.

17. The inflatable device as set forth in claim 10 further comprising an armrest core and the backing is further defined as a surface of the armrest core.

18. A door assembly comprising:
a trim panel;
an armrest core supported on the trim panel; and
an inflatable device supported by only the armrest core and including an inflation chamber defined by a backing attached to the armrest core, a cover, a pleated side extending between the armrest core and the cover, and a fabric side extending between the armrest core and the cover along the pleated side.

19. The door assembly as set forth in claim 18 wherein the cover and the pleated side are plastic.

20. The door assembly as set forth in claim 18 wherein the trim panel includes an interior surface extending upwardly and downwardly from the inflatable device.

* * * * *